(12) United States Patent  
Le

(10) Patent No.: US 8,190,990 B2
(45) Date of Patent: May 29, 2012

(54) ANNOTATING WEBPAGE CONTENT

(75) Inventor: Sang Van Le, San Jose, CA (US)

(73) Assignee: Google Inc., Mountain View, CA (US)

( * ) Notice: Subject to any disclaimer, the term of this patent is extended or adjusted under 35 U.S.C. 154(b) by 528 days.

(21) Appl. No.: 12/163,778

(22) Filed: Jun. 27, 2008

(65) Prior Publication Data

US 2009/0327855 A1 Dec. 31, 2009

(51) Int. Cl.
G06F 15/16 (2006.01)
(52) U.S. Cl. .................. 715/231; 715/230; 715/233
(58) Field of Classification Search .............. 715/200, 715/205, 230, 231, 233
See application file for complete search history.

(56) References Cited

U.S. PATENT DOCUMENTS

| | | | |
|---|---|---|---|
| 6,297,819 B1 | 10/2001 | Furst | |
| 6,721,921 B1 | 4/2004 | Altman | |
| 7,299,407 B2 | 11/2007 | Joshi et al. | |
| 2001/0005859 A1* | 6/2001 | Okuyama et al. | 709/245 |
| 2002/0059373 A1* | 5/2002 | Boys | 709/204 |
| 2002/0152064 A1* | 10/2002 | Dutta et al. | 704/9 |
| 2005/0160357 A1* | 7/2005 | Rivette et al. | 715/512 |
| 2005/0166138 A1* | 7/2005 | Kundu | 715/501.1 |
| 2005/0198191 A1* | 9/2005 | Carlson et al. | 709/217 |
| 2007/0226058 A1* | 9/2007 | Lorenzen et al. | 705/14 |
| 2008/0065649 A1* | 3/2008 | Smiler | 707/10 |
| 2008/0133584 A1 | 6/2008 | Nishino et al. | |
| 2008/0304518 A1* | 12/2008 | Cheng et al. | 370/474 |
| 2008/0306815 A1* | 12/2008 | Dykes et al. | 705/14 |
| 2009/0150764 A1* | 6/2009 | Farrell et al. | 715/234 |

OTHER PUBLICATIONS

Kim, Tae-Geun, Authorized Officer, Korean Intellectual Property Office, PCT application No. PCT/US2009/048944, filed Jun. 26, 2009, in International Search Report, mailed Feb. 12, 2010, 11 pages.

* cited by examiner

*Primary Examiner* — Stephen Hong
*Assistant Examiner* — Gregory J Vaughn
(74) *Attorney, Agent, or Firm* — Fish & Richardson P.C.

(57) ABSTRACT

Among other things, a computer-implemented method for annotating webpage content includes accessing a webpage in a browser, the webpage under control of a third party. A collection of annotations stored at a storage location is retrieved, the annotations collection associated with the webpage and an annotations author. The webpage is displayed with the retrieved annotations collection overlaid on the accessed webpage.

42 Claims, 11 Drawing Sheets

ANNOTATING WEBPAGE CONTENT

TECHNICAL FIELD

This specification relates to annotating webpage content.

BACKGROUND

Highlighted text can be produced on printed text, in a journal or a textbook. Highlighted text is also produced in electronic documents, using common word processing editors or pdf viewers. Typically, a reader marks text using highlighting means in order to display the text in a way that stands out on a paper or on a computer screen. One may add an annotation to the highlighted text to insert extra information related with the marked text. Also, an annotation can be inserted at a particular point in a document without marking the text at or near the annotation insertion point.

SUMMARY

This specification describes methods and systems for annotating webpage content, the webpages under control of third parties.

In one aspect, a computer-implemented method for annotating webpage content includes accessing a webpage in a browser, the webpage under control of a third party. A collection of annotations stored at a storage location is retrieved, the annotations collection associated with the webpage and an annotations author. The webpage is displayed with the retrieved annotations collection overlaid on the accessed webpage. Implementations can optionally include the following features. If the accessed webpage was modified by the third party, an alert is displayed, followed by removing from the annotations collection an annotation associated with the webpage modification. Also, when hovering a cursor over a highlighted text of the annotations collection, supplementary information associated with the highlighted text is displayed, including an address of a cross-referenced webpage. The user may access the cross-referenced webpage.

Further implementations can optionally include the following features. New annotations can be created and saved within the annotations collection. A new annotation can be created by highlighting a text block of interest or by importing a stored annotation. Verification information associated with the text block, including text offsets and a hash mask is recorded. Then the user can input supplementary information associated with the highlighted text. The supplementary information includes, but is not limited to, notes and addresses of cross-referenced webpages. The user can also edit or update displayed annotations. Furthermore, the user can remove at least one annotation from the annotations collection overlaid on the webpage. The annotations collection is updated to account for the at least one modified annotation. Additional annotations collections, available at the storage location, can be requested, retrieved and displayed alongside the initially retrieved annotations collection overlaid on the webpage. The user is alerted if a permission to access the additional annotations collections is denied.

In another aspect, a system for providing annotation information associated with web content includes a computerized device including a browser configured to access a webpage under control of a third party. The system also includes an annotation information repository configured to store collections of annotations associated with the webpage accessed by the browser. A browser plug-in is configured to retrieve a stored annotations collection. The browser displays the retrieved annotations collection overlaid on the accessed webpage.

System implementations can optionally include the following features. The annotation information repository includes a database configured to store annotations collections. The annotations collections are stored based on a set of identifiers which include a webpage address and an annotation author. The annotation information repository also includes an authentication module configured to verify permissions to the annotations collections. The annotations collection include verification records. The verification records contain permissions and text mapping information. The text mapping information further includes text offsets and a hash mask. The annotations collection also includes supplementary records. The supplementary records contain notes and addresses of cross-referenced webpages. The browser plug-in is configured to update the annotations collection upon creation or removal of an annotation on the accessed webpage. Also the browser plug-in is configured to retrieve multiple annotations collections. The browser displays the retrieved multiple annotations collections overlaid on the accessed webpage, where the multiple annotations collections can be created by other annotation authors.

In yet another aspect, a system for annotating webpage content includes a computerized device which contains a browser configured to access a webpage under control of a third party. The system also includes a collection of one or additional annotations made by an annotation author other than the third party associated with the webpage. The annotations collection are stored at a storage location. The system also contains a browser plug-in configured to retrieve a stored annotations collection. The browser displays the retrieved annotations collection overlaid on the accessed webpage.

System implementations can optionally include the following features. The browser plug-in is configured to update the annotations collection upon creation or removal of an annotation on the accessed webpage. Also the browser plug-in is configured to give retrieve multiple annotations collections. The browser displays the retrieved multiple annotations collections overlaid on the accessed webpage, where the multiple annotations collections can be created by other annotation authors.

The subject matter described in this specification potentially can provide various advantages. For example, users can annotate the content of a webpage under control of a third party, by highlighting the information. The annotated content can be retrieved and displayed in a browser from anywhere and at later time. The appearance of the highlighted text is saved, as if the user has highlighted the information on paper, in an actual book.

The subject matter described in this specification can be implemented as a method or as a system or using computer program products, tangibly embodied in information carriers, such as a CD-ROM, a DVD-ROM, a HD-DVD-ROM, a Blue-Ray drive, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

Other features, objects, and advantages of the subject matter of this specification will be apparent from the description and drawings, and from the claims.

DETAILED DESCRIPTION

This document describes systems and techniques for annotating webpage content, the webpages under control of third parties. For example, a user can access a webpage about planet Jupiter, say at http://www.nasa.gov/worldbook/jupiter_worldbook.html, and may highlight on the page the paragraph related to the time it takes Jupiter to spin around once around its axis. The webpage resides on a remote server (at a NASA data center) on the internet and the user cannot modify the code of the webpage as the webpage is under control of a third party. Therefore, when the webpage is accessed either later in time, or from another point of access, the webpage does not feature the highlighted text, as prepared during the previous page visit.

Figure 1:
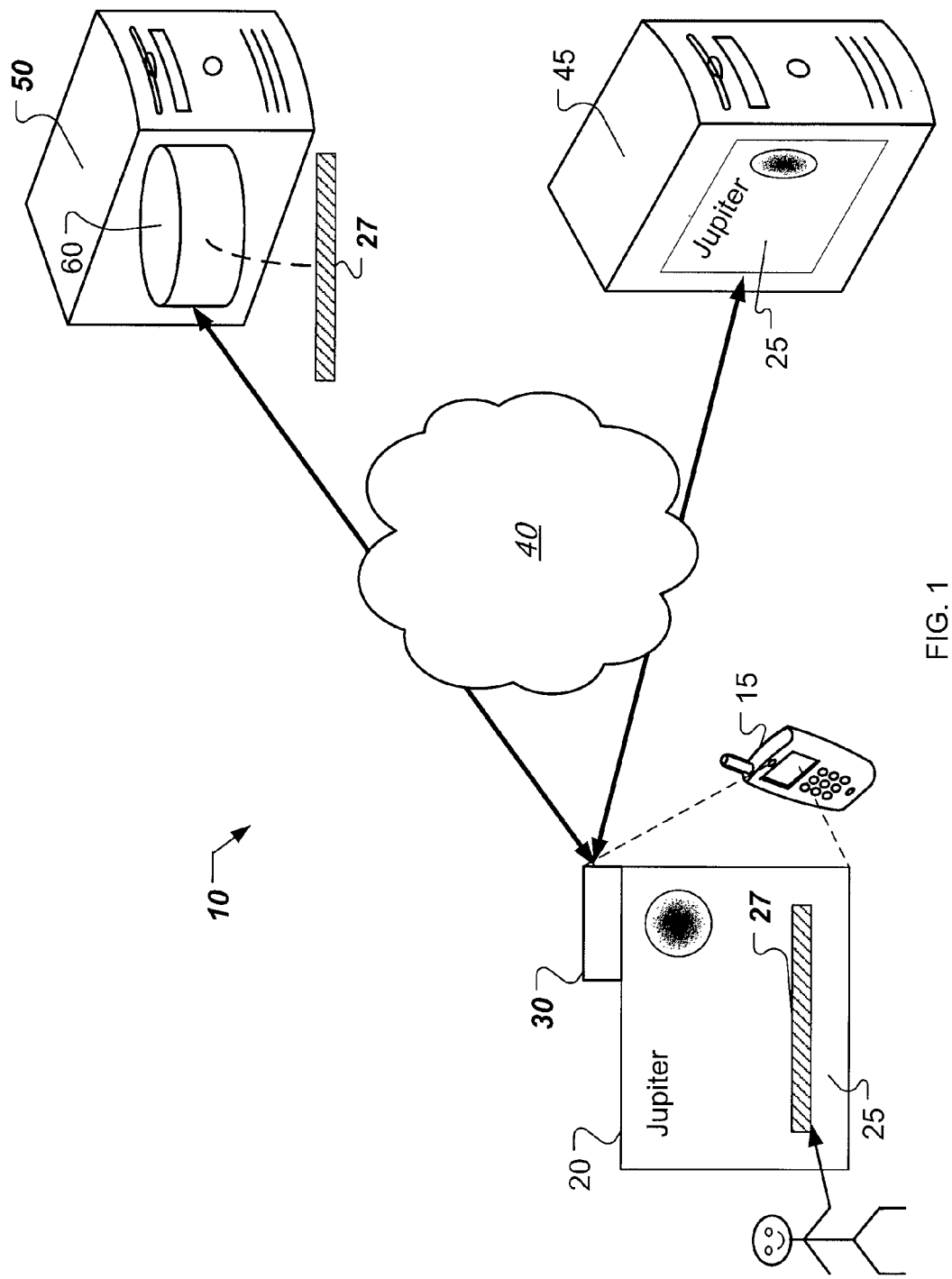
FIG. 1 is a schematic of an exemplary webpage content annotation system.

In the exemplary system shown in FIG. 1, a user accesses a webpage 25 under control of a third party, the webpage file located on a remote server 45 on the internet. By using the webpage content annotation system 10 of FIG. 1, the user views the webpage 25 in a browser 20, including text highlights 27 or other annotations authored by the user during a previous access of the webpage. Therefore, the webpage content annotation system 10 allows the user to annotate the content of a webpage 25 under control of a third patty, by highlighting the information. The annotated content may be retrieved and displayed in a browser from anywhere and at later time. The appearance of the highlighted text is saved, as if the user has highlighted the information on paper, in an actual book. In this specification, browser includes any HTML-enabled application that runs on a computerized electronic device.

The webpage 25 is accessed using a computerized electronic device 15 equipped with a browser 20. The computerized electronic device 15 may be a PC, laptop, web-enabled PDA, mobile phone, etc. The functionality of the browser 20 is extended with an annotation plug-in 30. In one implementation, the annotation plug-in 30 is an add-on the GOOGLE toolbar. In another implementation, the annotation plug-in 30 is added to the GMAIL toolbar. In another aspect, the annotation plug-in 30 can work with any browser 20 or any third party web-based products or applications, not just the Google toolbar or the GMAIL toolbar. The annotation plug-in 30 receives from the browser access to the viewing content. Furthermore, the browser displays content retrieved by the annotation plug-in. In yet another implementation, the functionality of the annotation plug-in 30 may be incorporated in the browser 20.

In an exemplary implementation, the annotation plug-in 30 requests from an annotation information repository 50 annotated data 27 and other supplementary information associated with the accessed webpage 25. The annotation information repository 50 is a local or a remote target that provides annotated data upon request. In one example, a local annotation information repository may be a PC's hard disk or random access memory (RAM), or a PDA's flash memory/RAM. For local targets, the annotation plug-in 30 reads the annotated data 27 directly from the hard disk or RAM. In the example sketched in FIG. 1, a remote annotation information repository 50 is located at a Google data center. The annotated data 27 is stored in a database 60 on a data center server. For remote targets, the annotation plug-in 30 makes a network request, such an HTTP/HTTPS request.

Once the annotation plug-in 30 has retrieved the available annotated data 27 associated with the accessed webpage, the browser 20 displays the accessed webpage 25 with the annotated data, if any, overlaid on the webpage 25. The annotation plug-in 30 can manage the annotations in various ways including adding annotations, removing annotations, sorting annotations by dates, by webpage address, by number of annotations per webpage 25, etc.

Figure 2:
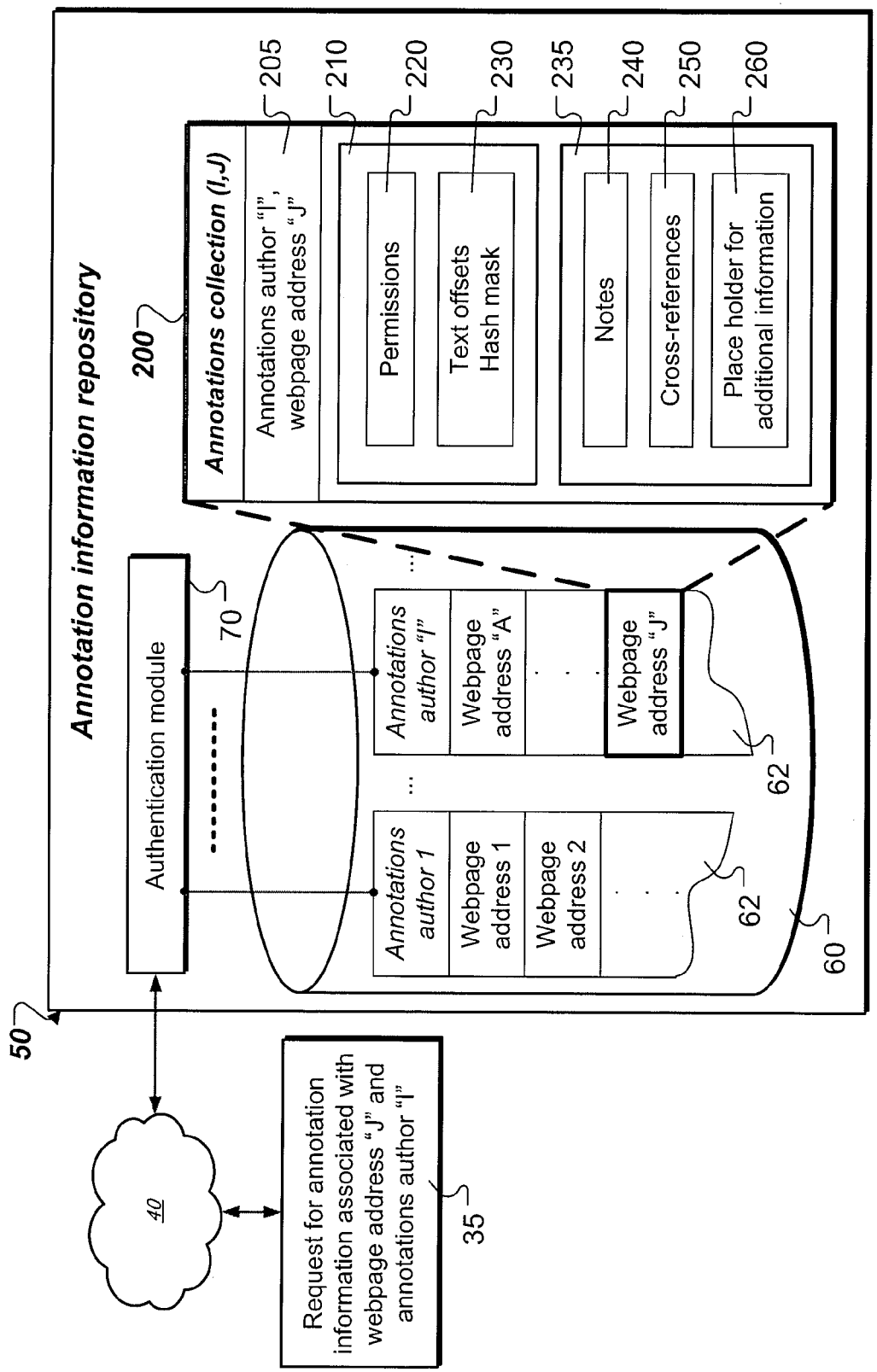
FIG. 2 is a schematic of an exemplary system configured to provide webpage content annotation information.

FIG. 2 is a box diagram of an exemplary implementation of the annotation information repository 50. In this implementation, a relational database 60 contains tables 62, each table corresponding to an annotation author. The records in each table 62 contain collections of annotated data 200 grouped by an address of an annotated webpage. Therefore, an annotations collection 200 is a record associated with a user and a webpage address. In another implementation, each table 62 of the relational database 60 corresponds to the address of the annotated webpage, and the records in each table 62 contain collections of annotated data 200 grouped by author. In the exemplary implementation sketched in FIG. 2, the annotations collection (I, J) 200 may correspond to annotation author "I", and webpage address "J". An annotations collection identifier 205 contains the name of the annotation author and the webpage address. Referring to the example illustrated in FIG. 1, the name of the annotation author may be Igor, and the address of the webpage containing information on Jupiter is http://www.nasa.gov/worldbook/jupiter_worldbook.html. In this example, the address of the webpage can be stored in the database as a text field. In another aspect, the address of the webpage can be stored by its hash code. Database tables containing records stored in hash code format can by searched very efficiently.

Returning to FIG. 2, a request for access 35 to specific annotations collections 200 is handled by an authentication module 70. In an exemplary implementation, a user is given access only to the annotations collections 200 for which he is also identified as an annotation author. In one implementation, the permissions to access an annotations collection 200 are set by the annotation author at the time the annotation collection 200 is made.

Each annotations collection (I, J) 200 contains two types of records: verification records 210, and supplementary records 235. The verification records 210 include a permissions record 220, and a text mapping record 230. The permissions record 220 contains authentication information. Furthermore, the permissions record 220 may contain permissions given to other users, for example friends. In one implementation, a friend may be identified by the friend's email address. Moreover, the annotations author may give the friend access to an annotations collection or a subset of the annotations collection. For example, annotation author Igor can grant a classmate, Kate, access to Igor's annotation collection. Permissions may be only partially reciprocated. For example, Kate may choose not to grant Igor access to Kate's entire annotation collection, but only to a subset of her annotations collection.

The text mapping record 230 contains the text offsets and the hash mask of the highlighted text 27, thus the text mapping information is encrypted for storage. By storing only the offsets of where the highlighted text 27 starts and where it ends within the web document 25, the annotations collection 200 does not included the text itself, thus avoiding issues related to intellectual property rights. Additionally, the hash code of the highlighted text 27 is computed to detect differences between the highlighted text and the text in the currently accessed webpage. The supplementary information may be optionally stored as part of an annotations collection. The supplementary information 235 may include notes 240 about the highlighted text 27. The supplementary information 235 may also include other relevant webpage addresses, cross-correlated 250 with the highlighted text. In case the annotations author does not choose to include supplemental information 235, a supplemental information place holder 260 is stored with the annotations collection 200.

Figure 3:
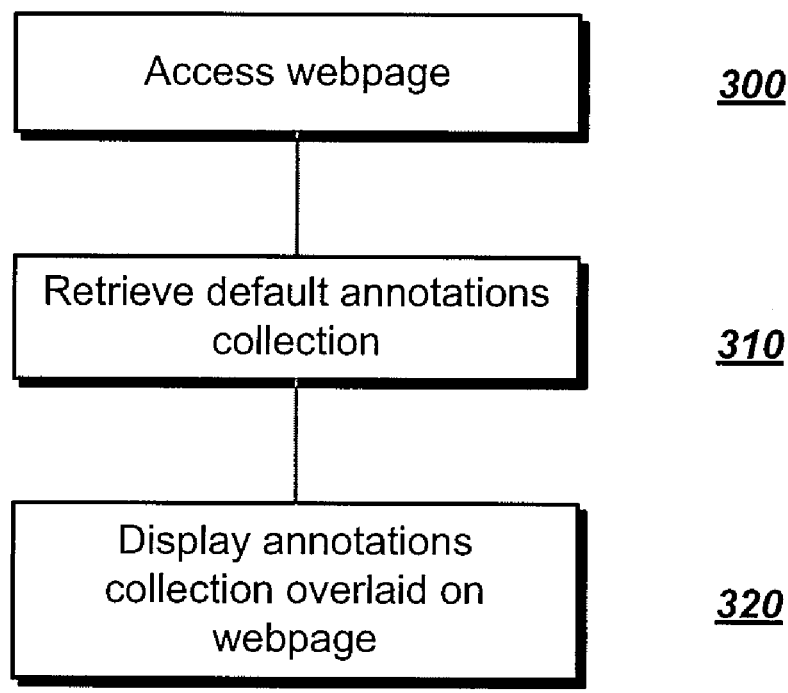
FIG. 3 shows an exemplary method for displaying annotations overlaid on a webpage under control of a third party.

FIG. 3 is an exemplary method for accessing a previously annotated webpages. In one implementation the method includes steps that can be implemented as instructions and executed in part by a processor in the computerized electronic device 15 and in part by a processor in the system located at the annotation information repository 50. The method can begin with step 300 where the user accesses a webpage 25, the webpage under control of a third party. The user may have accessed the webpage previously, and the user may have annotated the webpage on a previous visit. The user may also be accessing the webpage for the first time. The request for access is made from a web-browsing supported client application 20 on a computerized electronic device 15. The request is done by typing in the webpage address, for example http://www.nasa.gov/worldbook/jupiter_worldbook.html.

During the second step of the method, the annotations collection 200 associated with the webpage 25 is retrieved. In one implementation, the annotations collection 200 being retrieved upon accessing the webpage 25 is a default annotations collection. The default annotations collection for the accessed webpage 25 may contain only annotations authored by the user accessing the webpage 25. The annotations contained in the default annotations collections were authored by the user during a previous visit of the currently accessed webpage 25. The annotations collection 200 is being retrieved by an annotation plug-in 30. The annotation plug-in 30 places a request 35 for annotation information to the annotation information repository 50 as shown in FIG. 2, the request 35 based on the identity of the user and the address of the webpage.

Returning to FIG. 3, in step 320, the browser 20 displays the retrieved annotations collection 200 overlaid on the webpage. In one implementation, if the default annotations collection has been retrieved, the user views the accessed webpage 25 including the highlighted text 27 and other annotations exactly as the annotations collection 200 overlaid on the webpage 25 appeared during his previous visit.

Figure 4:
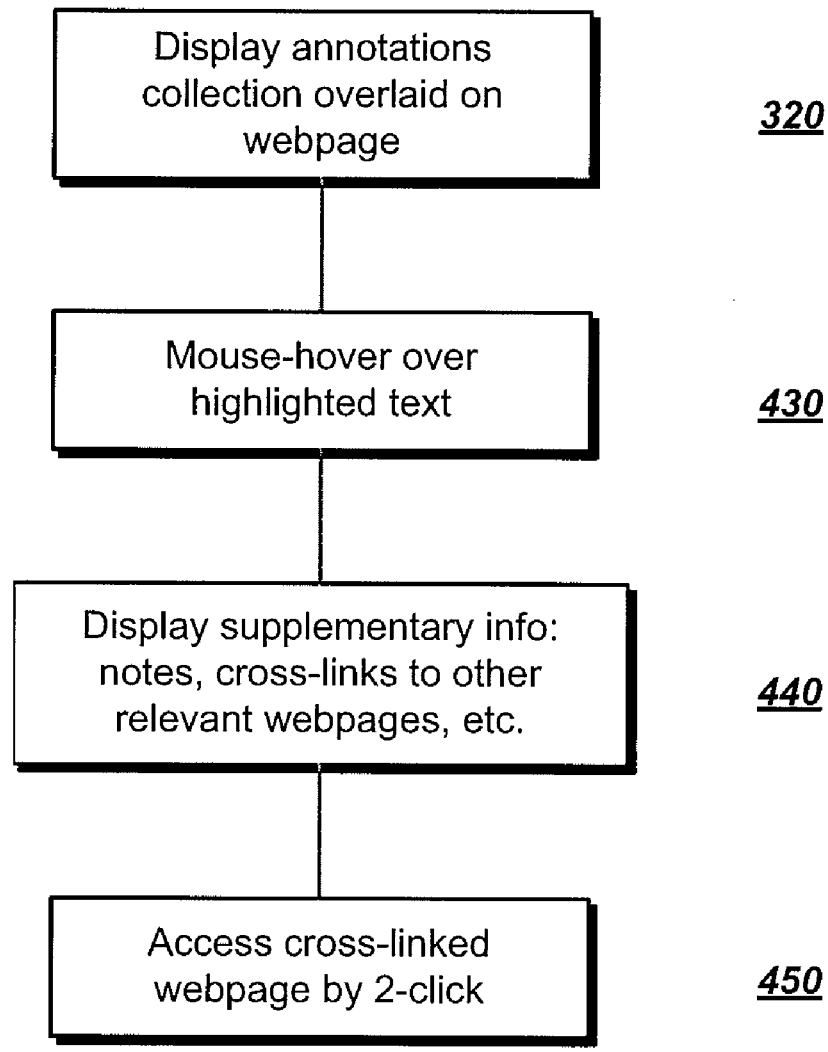
FIG. 4 shows an exemplary method for displaying annotations overlaid on a webpage under control of a third party.

Referring to FIG. 4, once the browser 20 displays the retrieved annotations collection 200 overlaid on the accessed webpage 25, the user may peruse the webpage 25. As the mouse hovers 430 over the highlighted text 27, supplementary information 235 may be displayed 440. For example, the highlighted text 27 containing information on the "ancient astronomers naming Jupiter after the king of the Roman gods" may be cross-referenced 250 to a webpage related to Roman mythology, http://en.wikipedia.org/wiki/Roman_Mythology. As shown in step 450, by right-clicking on the cross-referenced 250 address, the cross-referenced webpage may be displayed in another browser window or another tab of the same browser window. The annotations collection 200 associated with the highlighted text 27 on the "ancient astronomers naming Jupiter after the king of the Roman gods" may include notes 240 on planet naming conventions, etc., authored by the user during previous accesses of the webpage 25.

Figure 5:
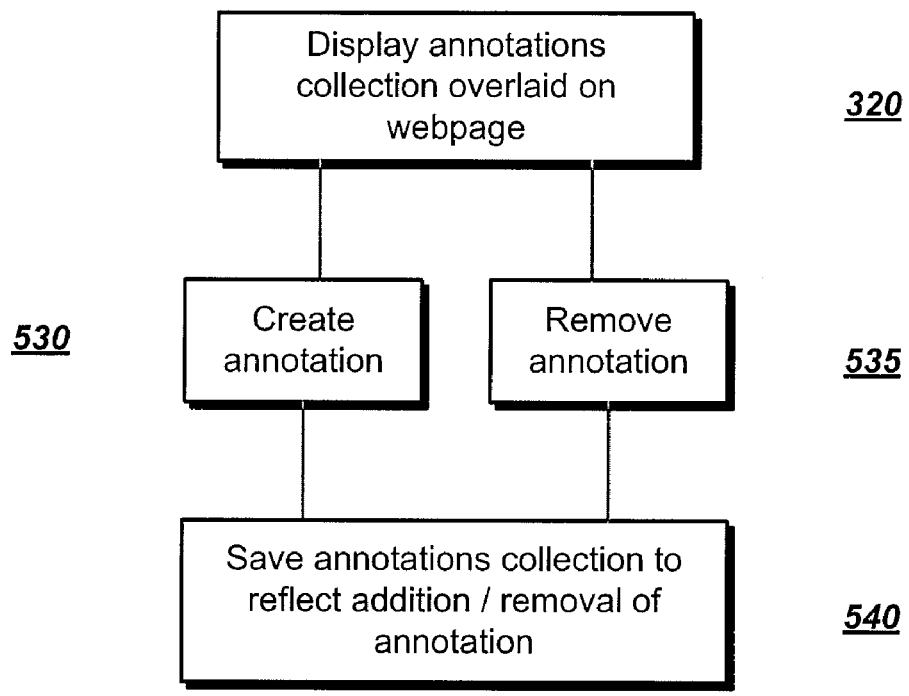
FIG. 5 shows an exemplary method for creating or removing annotations overlaid on a webpage under control of a third party.

Referring to FIG. 5, once the browser 20 displays 320 the retrieved annotations collection 200 overlaid on the accessed webpage 25, the user may continue to study the webpage 25. When the user finds additional information on the webpage 25, say information relevant for his assignment, the user may create 530 another annotation. For example, using a mouse or a keyboard, the user may highlight the text containing information about the names of Jupiter's moons: "Jupiter's four largest satellites, in order of their distance from Jupiter, are Io, Europa, Ganymede, and Callisto." The user may also cross-reference 250 to the newly highlighted text the webpage on Roman mythology mentioned above. The newly added annotation is saved 540 as part of the annotation collection 200 associated with the currently accessed webpage 25 and current annotation author. For example, the annotations collection (I, J) 200, associated with annotations made by Igor on the webpage about Jupiter, now includes two highlighted text blocks 27, a cross-reference 250 webpage associated with both highlighted text blocks 27, and notes 240 associated with one of the highlighted text blocks 27. The newly saved annotations collection 200 is stored in the database 60 at the annotation information repository 50.

In another aspect, an annotation author can make changes to the supplemental information 235 that is associated to an existing highlighted text block 27. The annotations author may add additional notes 240 and cross-references 250. The annotations author may also remove existing supplemental information 235 associated with an existing highlighted text block 27, including notes 240 and cross-references 250. The modifications made in regard to the supplemental information 235 associated with the highlighted text block 27 is saved as part of the annotations collection 200 associated with accessed webpage 25.

Conversely, if the annotations collection 200 contains an annotation that is no longer of interest to the user, the user can remove the unwanted annotation and save the annotations collection 200 to reflect the removal of the unwanted annotation. In one implementation, the user may remove an annotation entirely, by de-highlighting a text block 27 using a mouse or keyboard. The supplementary information 235 associated with the highlighted text 27 is also discarded. In another implementation, the highlighted text 27 of an annotation may be preserved, but the supplementary information 235 associated with the highlighted text 27 may be modified (by adding to it, or partially/entirely removing it.) The newly modified annotations collection 200 is saved and stored in the database 60 on a server of the annotation information repository 50. In the exemplary implementation illustrated schematically in FIG. 5, the step 530 of creating a new annotation, and the step 540 of saving the annotation as part of the annotations collection 200 associated with the accessed page 25 can be repeated as many times as necessary. Moreover, the step 535 of removing an unwanted annotation, and the step 540 of saving the annotations collection 200 associated with the accessed page 25 can also be repeated as many times as necessary.

Figure 6:
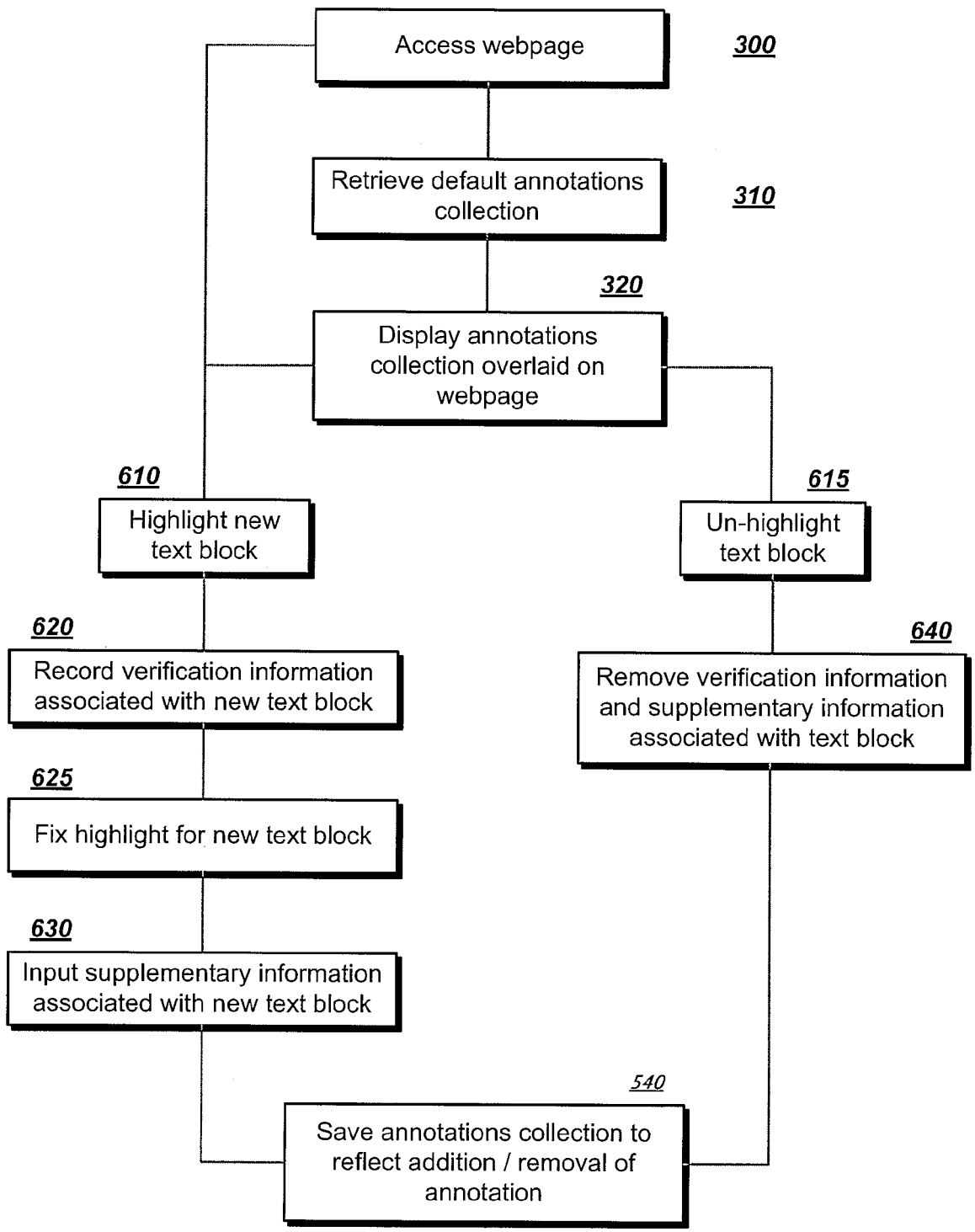
FIG. 6 shows an exemplary method for creating or removing annotations overlaid on a webpage under control of a third party.

Another exemplary method of annotating an accessed webpage 25 are described in FIG. 6. Once a desired webpage 25 is accessed 300, the user may decide to mark a portion of the webpage by highlighting 610 a block of text. The offsets of where the text starts and ends within the web document 25 are captured by the annotation plug-in 30, and the hash code of the text is computed 620. The information collected in step 620 is stored as part of the text mapping record 230 included in an annotations collection 200. Furthermore, after the text highlighting step 610, the annotation plug-in 30 modifies the accessed webpage 25, which is currently loaded in the memory of the computerized electronic device 15. The modification includes adding appropriate HTML tags to display the highlighted text 27. By "fixing" the recently highlighted text 27 in this manner, the user may highlight 610 another portion of the text of the accessed webpage 25 and not "loose" the highlight-property of the previously highlighted text. In step 630 of the exemplary method shown in FIG. 6, the user may input notes 240 associated with the highlighted text 27. The user may also add the address of cross-referenced 250 webpages associated with the highlighted text 27. The information input in step 630 is stored as part of the supplementary record 235 included in the annotations collection 200. In step 540, the newly added annotation is saved as part of the annotation collection 200 associated with the currently accessed webpage 25 and current annotation author.

In another aspect, an annotation author can highlight a paragraph that already contains a previously highlighted text block 27. The annotation plug-in 30 prompts the user with the choice of overwriting the previously highlighted text block 27. At this time, the annotation author also has the choice of retaining the previously entered supplementary information 235 as part of the newly created annotations collection 200. Therefore, if the annotation author chooses so, only one annotation is associated with the highlighted paragraph, instead of more than one annotations.

Figure 7:
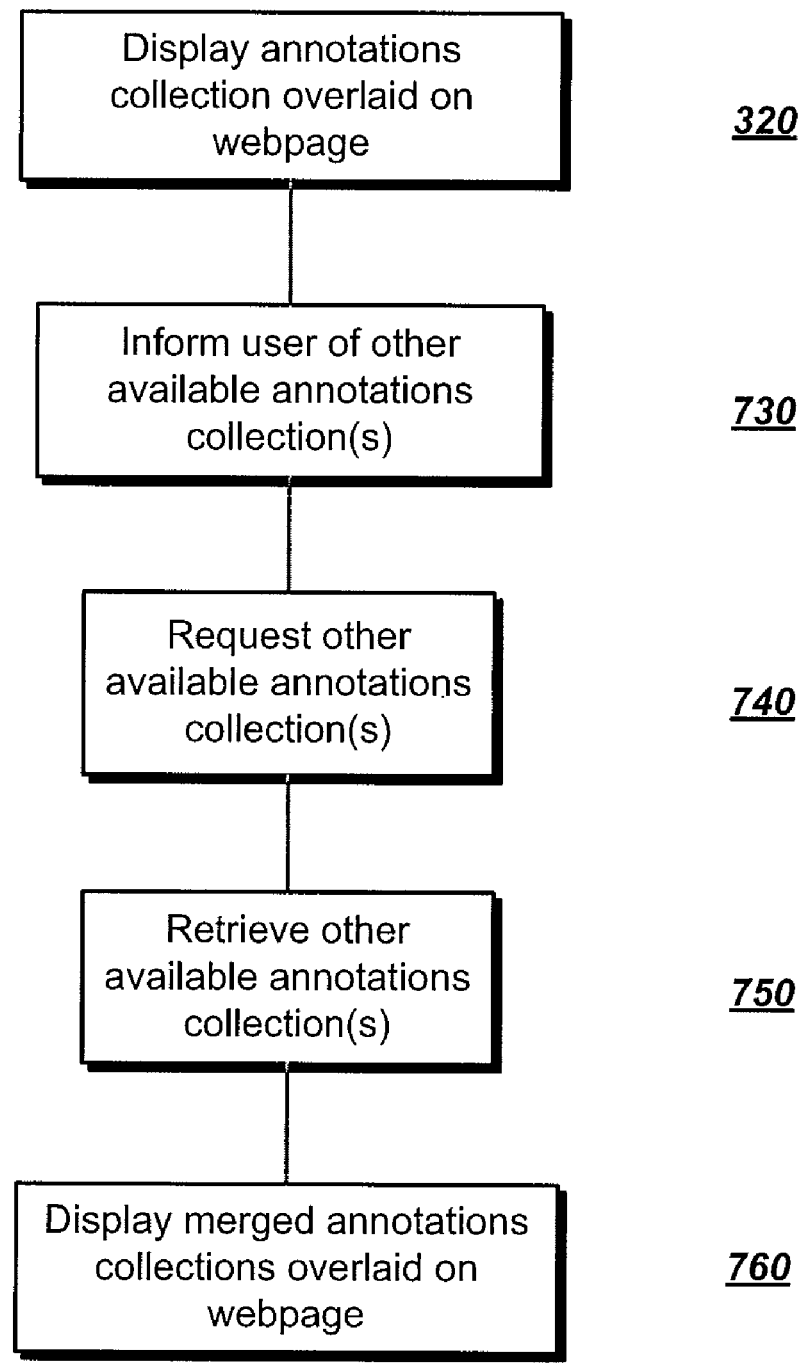
FIG. 7 shows an exemplary method for displaying annotations overlaid on a webpage under control of a third party.

In another implementation illustrated in FIG. 7, once the browser 20 displays 320 the retrieved annotations collection 200 overlaid on the accessed webpage 25, the annotation plug-in 30 may inform 730 the user that other annotations collections 200' associated with the accessed webpage 25 are available at the annotation information repository 50. For example, other annotations collections 200' associated with the accessed page 25 about Jupiter may have been generated by the method described in FIGS. 5-6 by a different annotations author, Kate, a member of Igor's study group. Kate collected information on the physical properties of Jupiter, thus the annotations collection 200' created by Kate includes a highlighted text 74 stating that "Jupiter is a giant ball of gas and liquid with little, if any, solid surface." Kate added to the annotations collection 200' the address of a cross-referenced 250 webpage, http://en.wikipedia.org/wiki/Alternative_biochemistry, concerning the possibility of non-carbon based life.

Returning to FIG. 7, a request 740 for annotation information is placed by the annotation plug-in 30 to the annotation information repository 50. The annotation plug-in 30 may retrieve the additional annotations collection (K, J) 200' on the webpage 25 about Jupiter, associated with annotation author Kate. The retrieving is possible only if Igor, the viewer of the accessed webpage 25 has the necessary permissions 220 to retrieve the additional annotations collection (K, J) 200'. In step 760, the browser 20 displays the retrieved additional annotations collection 200' overlaid on the accessed webpage 25. In this example, the accessed webpage 25 showcases at least two annotations collections 200 and 200' on the webpage 25 about Jupiter, one annotations collection (I, J) 200 authored by Igor (the current viewer) and another annotations collection (K, J) 200' authored by Kate (a member of Igor's study group).

In another implementation, the retrieved additional annotations collection 200' may be saved as annotations collection 200 associated with the accessed webpage 25. Thus, the webpage content annotation system 10 provides a convenient environment to share information collaboratively.

In yet another implementation, the retrieving 750 of other available annotations collection may be occurring locally. In this implementation, the available annotations collection 200' may be stored on a flash memory (or memory stick) part of (or attached to) the computerized electronic device 15 used by the user of the webpage content annotation system 10.

Figure 8:
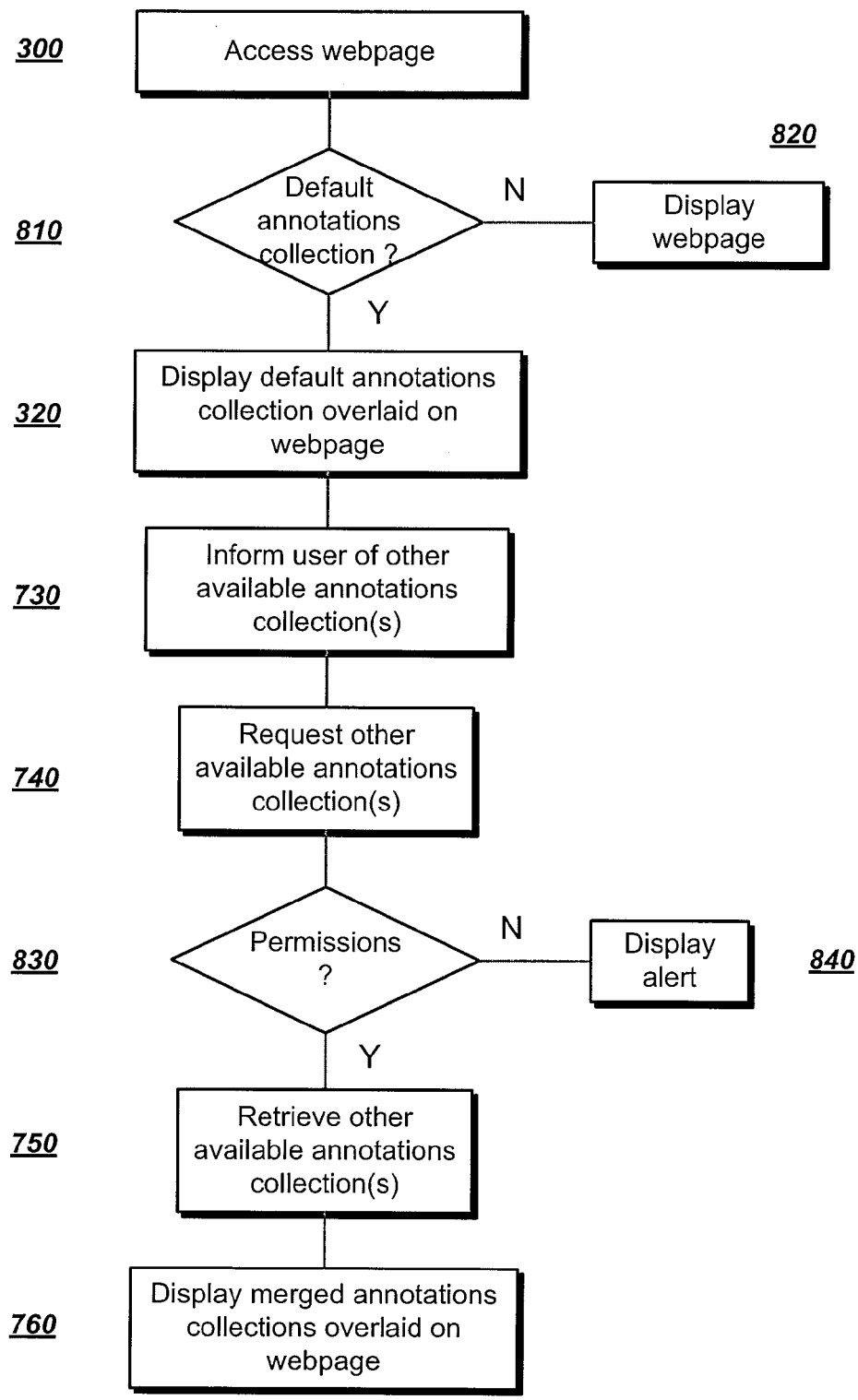
FIG. 8 shows an exemplary method for displaying annotations overlaid on a webpage under control of a third party.

Referring to the exemplary method illustrated schematically in FIG. 8, the step of accessing 320 the webpage 25 causes the annotation plug-in 30 to verify 810 with the annotation information repository 50 if a default annotations collection exists for the accessed webpage 25. Such default annotations collection for the accessed webpage 25 may contain only annotations authored by the user accessing the webpage 25. The annotations contained in the default annotations collections were authored by the user during a previous visit of the currently accessed webpage 25. If the annotations information repository 50 does not store such default annotations collection, the browser 20 displays 820 the accessed webpage 25 as is. If a default annotations collection is stored by the annotations information repository 50, then the annotation plug-in 30 retrieves and displays 320 the default annotations collections.

In the exemplary method presented schematically in FIG. 8, the method continues by informing 730 the viewer of other available annotations collections 200', followed by the user requesting 740 other available annotations collections 200'. As part of the conditional step 830, the annotation plug-in 30 verifies if Igor, the current viewer of the webpage 25 about Jupiter, has permission to view the available annotations collection (K, J) 200', associated with the webpage 25 about Jupiter and authored by Kate. The permissions information 220 is part of the verification record 210 of an annotations collection 200', as shown in FIG. 2. Furthermore, permission to retrieve an annotations collection 200 is verified via the authentication module 70 of the annotation information repository 50. In another implementation, the permission information may also be part of the supplementary information. For example, some of the supplementary notes can be shared/exported between users, but some other supplementary notes are restricted for the author's use.

Returning to the exemplary method of FIG. 8, if, for example, user "I" does not have permission to retrieve the available annotations collection (K, J) 200', the annotation plug-in 30 displays 820 an alert message for user "I" on the client computerized electronic device 15. If on the other hand, user "I" has permission to retrieve the available annotations collection (K, J) 200', the annotation plug-in 30 retrieves the available annotations collection 200', in step 750. Then, the browser displays the retrieved additional annotations collection 200' overlaid on the accessed webpage 25. In this example, the accessed webpage 25 includes for viewing at least two annotations collections 200 and 200' on the webpage 25 about Jupiter, one annotations collection (I, J) 200 authored by Igor (the current viewer) and another annotations collection (K, J) 200' authored by Kate (a member of Igor's study group).

In one aspect, the annotations collections 200 can be shared via permissions. An annotations author, for example Kate, may choose to share her annotation collections at the granularity of webpage by using a web-based sharing tool to grant or revoke permissions on accessing the annotation collection. Another user may want to retrieve an annotations collections 200 shared by Kate. For example, while viewing a webpage 25 at address "J", Igor may request the annotation information repository 50 for access to the annotations collection 200 authored by Kate in association with webpage address "J". In one implementation the request is an HTTP request. Furthermore, both Igor and Kate may be, for example, Google toolbar users or GMAIL users. In this example the annotation information repository 50 would be Google. In another example, Igor may be a GMAIL user and Kate a Yahoo! Email user. Then Igor requests for Kate's annotations collection 200 from Yahoo!, because in this example Yahoo! would be the annotation information repository 50. Typically both annotation information repositories 50, Yahoo! and Google would have a common interface 35 for requesting annotations collections 200. The common interface for requesting 35 annotations collections 200 may be implemented using SOAP.

In another exemplary implementation, the annotations collections may also be shared via exporting and importing on the local computerized electronic device or on a local network folder. For example, Kate exports and saves her annotations collections to a file. The file is then transferred to Igor via email or some other type of file transfer, for example, by using memory stick, a local network folder, etc. In this implementation, there may be no permissions record associated with the content of this file. In this case the annotations collection saved on the local electronic device may contain no permissions information record. Once Igor retrieves the file onto his computerized electronic device, the annotations plug-in added on to Igor's browser can import the annotation collection.

Figure 9:
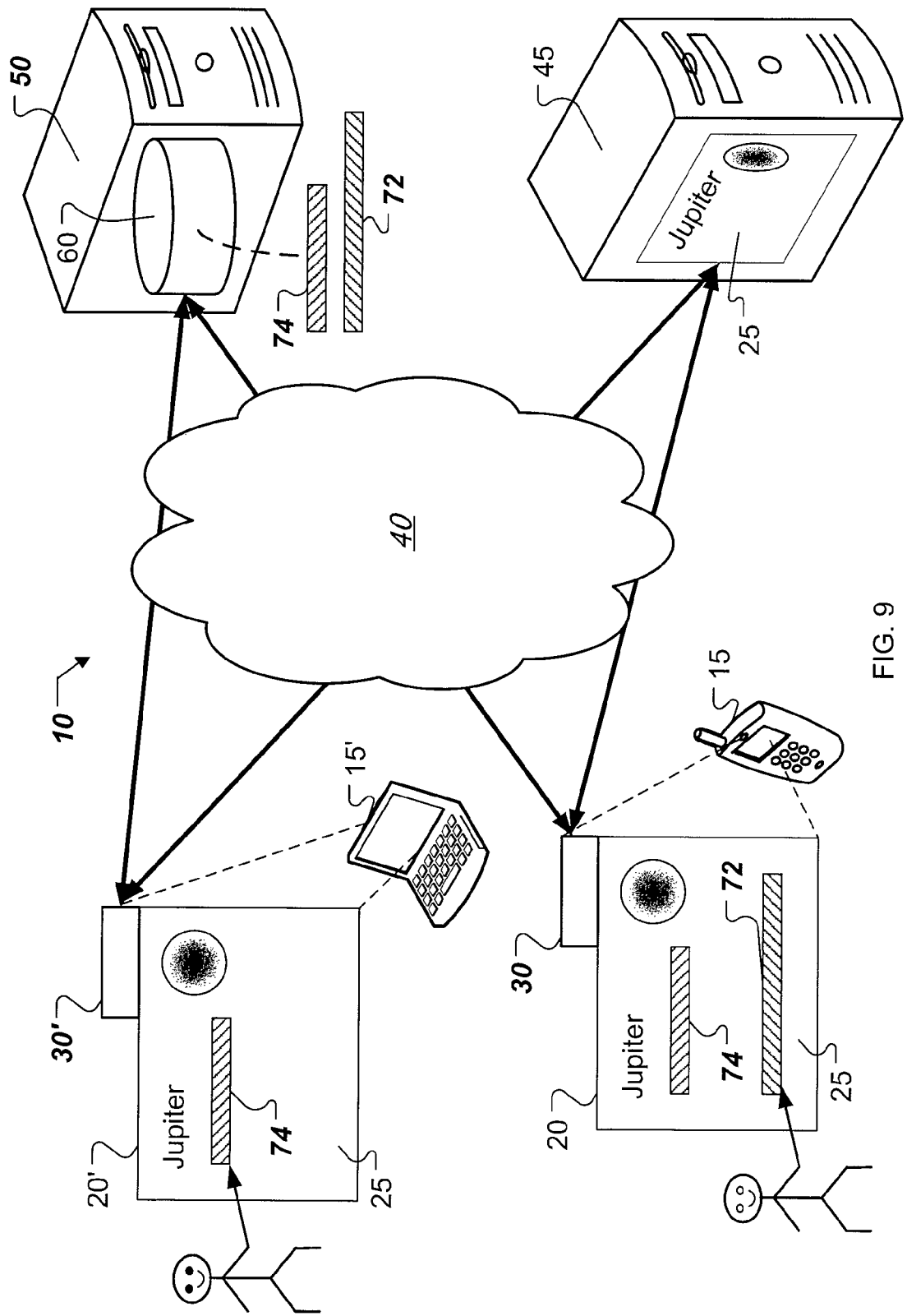
FIG. 9 is a schematic of an exemplary webpage content annotation system.

The use of the exemplary method described above is illustrated schematically in FIG. 9. For example, one user, Igor, accesses a webpage 25 about Jupiter, the webpage 25 about Jupiter being controlled by a third part (NASA) 45. The webpage content annotation system 10 used by Igor allows him to display annotations overlaid on the accessed webpage 25. The annotations were authored in part by Igor during a previous visit of the accessed webpage, and in part by a member of his study group, Kate. The annotations are stored by an annotation information repository 50 and retrieved via an annotation plug-in 30. The annotations are stored in a database 60 on the annotation information repository 50 server, and are recorded as annotations collections 200 and 200' associated with the webpage address J, for example http://www.nasa.gov/worldbook/jupiter_worldbook.html, and also associated with an annotation author, Igor or Kate, respectively.

In another implementation of the webpage content annotation system 10, the annotations collections associated with a webpage address may be accessed by the annotations collection author. For example, Igor's highlights at the webpage address J, are only accessible by Igor. Kate's highlights at that same webpage address J are only accessible by Kate. Therefore, a webpage 25 under control of a third party 45 becomes a virtual book for users who have access to the web, with the added benefit that the virtual book can accommodate personalized highlights and annotations.

Figure 10:
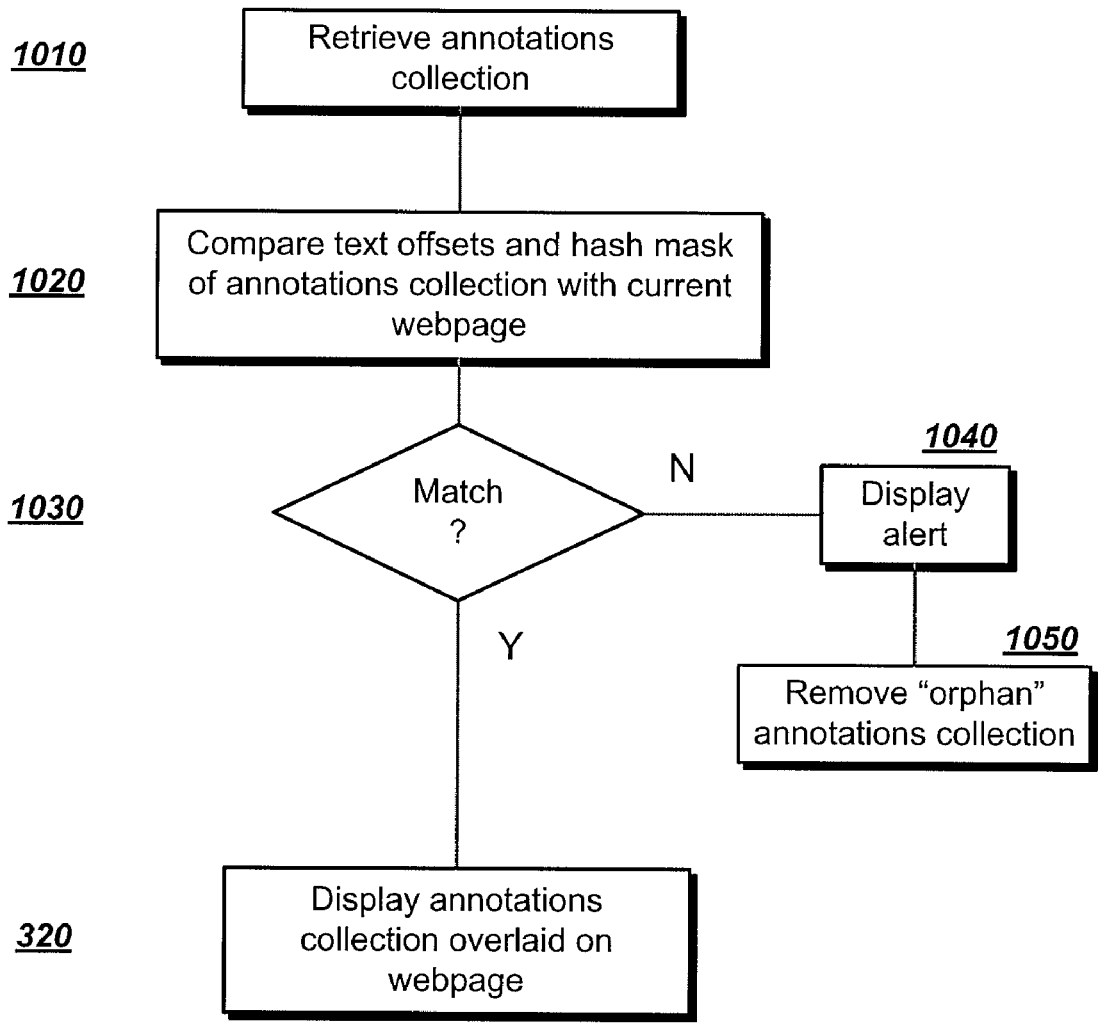
FIG. 10 shows an exemplary method for displaying annotations overlaid on a webpage under control of a third party.

In the exemplary method described in FIG. 10, the step 1010 of retrieving an annotations collection 200 for overlay with the accessed webpage 25 is followed by a verification step 1020. The webpage 25 is inherently controlled by a third party 45, therefore the accessed webpage 25 may have been modified since the time the user had accessed it. The annotations collection 200 includes a text-mapping record 230 to verify possible changes in the webpage content. In step 1020, the annotation plug-in 30 compares each pair of starting and ending text offsets and hash masks of the highlighted text 27 included in the retrieved annotations collections 200, with the corresponding text properties of the accessed webpage 25. If there is a match between the text-mapping record 230 of the annotations collection 200 and the currently accessed webpage 25, then the annotation plug-in 30 modifies the accessed webpage 25, which is now loaded in the memory of the computerized electronic device 15, the modification includes adding appropriate HTML tags to display the highlighted text 27, as shown in step 320.

If during the matching step 1030, the annotation plug-in 30 determines that the hash codes do not match, the web-contented annotation plug-in 30 displays 1040 an alert to inform the user of the un-matching, or partially un-matching highlighted text 27. The annotations collection 200, or part of it, is rendered orphan. In one implementation, the annotation plug-in 30 discards 1050 from the annotation information repository database 60 the annotations collection 200 associated with the missing highlighted text. In another implementation, the annotation plug-in 30 updates the annotations collection 200 to account for the missing highlighted text. Specifically, the annotation plug-in 30 offers the annotation author the choice to retain the supplementary information 235 associated with the "orphan" annotation. The retained supplementary information 235 is saved as part of the annotation collection 200 and may be associated with another highlighted text block 27 or with a newly created annotation.

Figure 11:
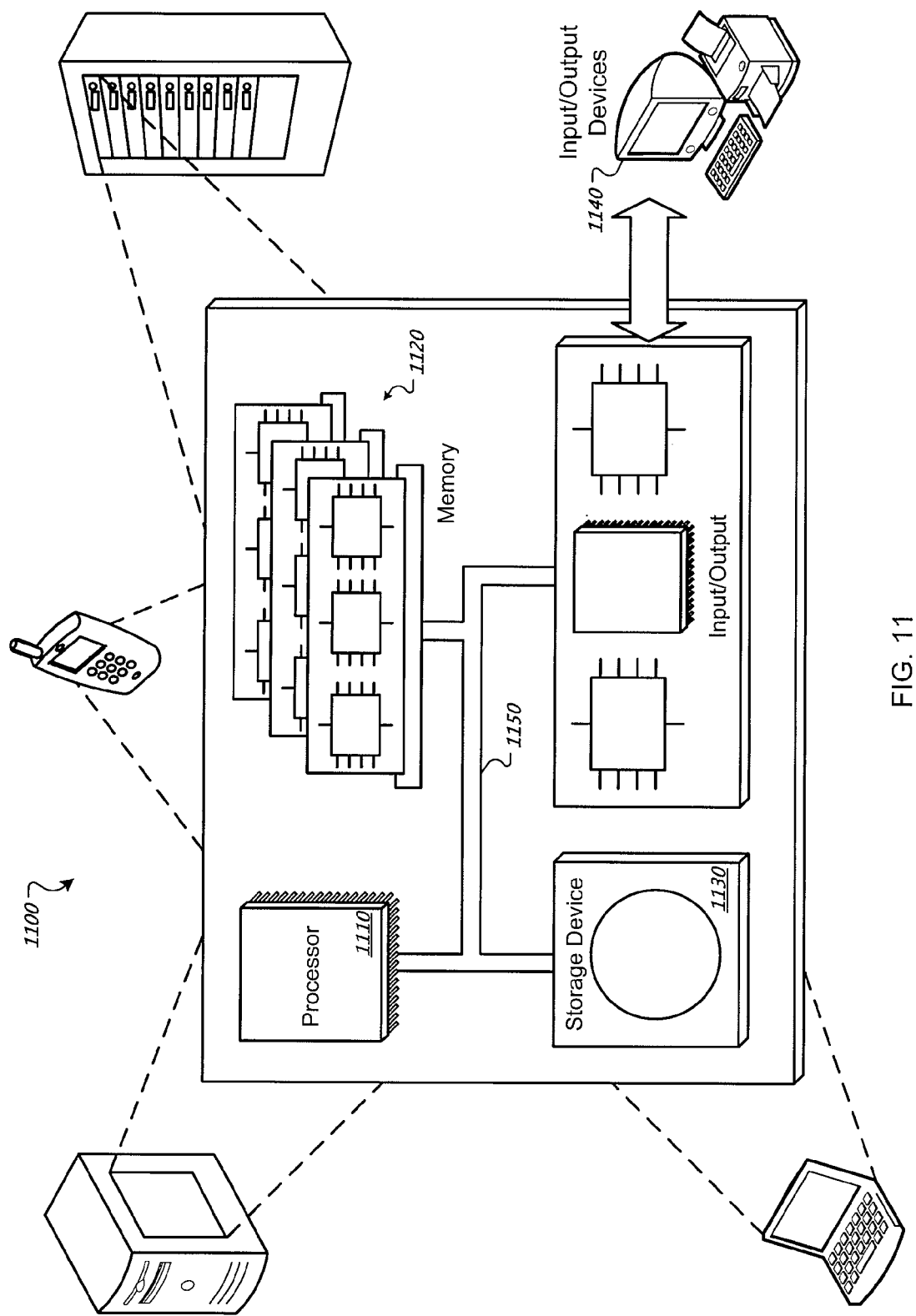
FIG. 11 is a schematic diagram of a computerized electronic device.

FIG. 11 is a schematic diagram of a computer system 1100 representing the computerized electronic device 15. Also the computer system 1100 can represent a server at the annotation information repository 50. The system 1100 can be used for the operations described in association with any of the computer-implement methods described previously, according to one implementation. The system 1100 is intended to include various forms of digital computers, such as laptops, desktops, workstations, personal digital assistants, servers, blade servers, mainframes, and other appropriate computers. The system 1100 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry; or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted-languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magnetooptical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or a web server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations of a webpage content annotation system have been described. Nevertheless, it will be understood that various modifications may be made without departing from the spirit and scope of the subject matter of this specification. For example, the webpage content annotation system may be integrated with a targeted advertising system. Ads can be shown/displayed to specifically match the annotated/highlighted text of a viewer's annotations collections stored at an annotation information repository. For example, a user who reads about the history of shoes and highlights information on shoes, may indicate affinity to seeing ads about shoes on sale, etc.

In another implementation, the annotation information system may be used on internets or extranets for collaborative work to improve work/productivity: For example, employees of a company may use the webpage content annotation system and methods for reading wiki pages or online user guides, making observations upon the content of the online user guides and sharing their observations collaboratively.

In the academic world, students may be able to carry computerized electronic devices instead of backpacks loaded with books. By using such web-enabled reading devices students can read online textbooks, thus having access to their own textbook to highlight and annotate as they wish. For example, instead of printed US history textbooks, there may be a web site with the US history textbook. The students can read their "own copies" of the textbook, and they can annotate as they please. Furthermore, if they choose to, the students may only see their own annotations.

Accordingly, other embodiments are within the scope of the following claims.

What is claimed is:

1. A computer-implemented method for annotating webpage content, the method comprising:
   receiving, at a browser running on an electronic device from a user associated with the electronic device, a request to access a webpage, the webpage being hosted by a webpage server system under control of a third party, the electronic device being communicatively coupled with the webpage server system;
   in response to said receiving from the user the request to access the webpage, requesting the webpage by the electronic device from the webpage server, and requesting, by the electronic device from an annotations repository system under control of an entity different from the third party, a collection of annotations stored at the annotations repository system, the annotations collection being associated with the webpage and authored by the user associated with the electronic device, the annotations collection including one or more annotations relating to corresponding one or more portions of webpage content of the webpage;

receiving, by the electronic device, a response from the webpage server system including a current instance of the requested webpage;

receiving, by the electronic device, a response from the annotations repository system including the requested annotations collection; and concurrently displaying, by the electronic device, the current instance of the webpage received with the response from the webpage server system and the annotations collection received with the response from the annotations repository system, such that the one or more annotations included in the received annotations collection are overlaid on the corresponding one or more portions of the webpage content of the received current instance of the webpage.

2. The method of claim 1, wherein the one or more annotations included in the annotations collection received with the response from the annotations repository system comprise two or more annotations, and the method further comprises:

in response to determining that a portion of the webpage content of the received current instance of the webpage, to which an annotation from among the two or more annotations included in the received annotations collection corresponds, has been modified by the third party since the annotation was created, removing, by the electronic device, from the received annotations collection the annotation corresponding to the modified portion of the webpage content; and transmitting, by the electronic device to the annotations repository system, the annotations collection without the annotation corresponding to the modified portion of the webpage content for updating the stored instance of the annotations collection.

3. The method of claim 1, wherein said concurrently displaying the received current instance of the webpage and the received annotations collection comprises:

in response to determining that a portion of the webpage content of the webpage, to which an annotation from among the one or more annotations included in the received annotations collection corresponds, has not been modified by the third party since the annotation was created, highlighting a text block from a portion of the webpage content of the received current instance of the webpage to which the annotation corresponds, and the method further comprises:

detecting a cursor being hovered by the user associated with the electronic device over the highlighted text block;

displaying, by the electronic device in response to said detecting of the hovering cursor, supplementary information associated with the annotation corresponding to the highlighted text block, including an address of a cross-referenced webpage; and receiving, from the user associated with the electronic device, a request seeking access to the cross-referenced webpage.

4. The method of claim 1 further comprising:

receiving, from the user associated with the electronic device, input creating at least one new annotation on the received current instance of the webpage in addition to the one or more annotations included in the received annotations collection; and transmitting, by the electronic device to the annotations repository system, the annotations collection with the at least one new annotation for updating the stored instance of the annotations collection.

5. The method of claim 4, wherein the creating of the at least one new annotations comprises:

receiving, from the user associated with the electronic device, input highlighting a text block of interest;

recording, by the electronic device as part of the new annotation, verification information associated with the highlighted text block, including text offsets and a hash mask of the highlighted text block;

receiving, from the user associated with the electronic device, input providing supplementary information associated with the highlighted text block, the supplementary information including notes and addresses of cross-referenced webpages; and recording, by the electronic device as part of the new annotation, the supplementary information associated with the highlighted text block.

6. The method of claim 1 further, wherein the one or more annotations included in the annotations collection received with the response from the webpage server system comprise two or more annotations, and the method further comprises:

receiving, from the user associated with the electronic device, input modifying at least one annotation from among the two or more annotations of the received annotations collection overlaid on the received current instance of the webpage, wherein the modifying includes removing, editing and updating; and transmitting, by the electronic device to the annotations repository system, the annotations collection with the at least one modified annotation for updating the stored instance of the annotations collection.

7. The method of claim 1 further comprising:

informing the user associated with the electronic device of one or more additional annotations collections being available at the annotations repository system, the one or more additional annotations collections having been authored by corresponding one or more other authors different from the user associated with the electronic device, and being associated with the webpage, each of the one or more additional annotations collections including one or more annotations relating to corresponding one or more portions of webpage content of the webpage;

receiving, from the user associated with the electronic device in response to said informing, a request to access an additional annotations collection from among the additional annotations collections;

in response to said receiving, from the user, of the request to access the additional annotations collection, requesting, by the electronic device from the annotations repository system, the additional annotations collection;

receiving, by the electronic device, a response from the annotations repository system including the additional annotations collection; and concurrently displaying, by the electronic device, the received current instance of the webpage, the received additional annotations collections and the initially received annotations collection, such that the one or more annotations included in the initially received annotations collection and the one or more annotations included in the received additional annotations collection are overlaid on the corresponding portions of the webpage content of the received current instance of the webpage.

8. The method of claim 7 further comprising:

receiving, from the user associated with the electronic device in response to said informing, another request to access another additional annotations collection from among the additional annotations collections;

in response to said receiving, from the user, of the other request to access the other additional annotations collection, requesting, by the electronic device from the annotations repository system, the other additional annotations collection; and causing the electronic device to issue an alert if a permission to access the other additional annotations collection at the annotations repository system is denied, the permission being included in the other additional annotations collection.

9. A system for providing annotation information associated with web content, the system comprising:

a data processor configured to communicate with multiple computerized devices associated with respective authors of webpage annotations; and an annotation information repository configured to store a plurality of collections of annotations, each of the plurality of the annotations collections having been authored by an associated annotations author and corresponding to an associated webpage, such that each of the plurality of the annotations collections includes one or more annotations relating to corresponding one or more portions of webpage content of the associated webpage, wherein the data processor is configured to perform operations comprising receiving, from a computerized device from among the multiple computerized devices that is associated with a specified author, a request to retrieve an annotations collection from among the stored plurality of annotations collections, the annotations collection referenced in the received request having been authored by the specified author, and corresponding to a specified webpage being accessed by the computerized device associated with the specified author from a webpage server system, the annotations collection referenced in the received request including one or more annotations relating to corresponding one or more portions of webpage content of the specified webpage, retrieving, from the annotation information repository, the annotations collection referenced in the received request, and transmitting the retrieved annotations collection to the computerized device to enable the computerized device to concurrently display the transmitted annotations collection and a current instance of the specified webpage, in such a way that the one or more annotations included in the transmitted annotations collection would be overlaid on the corresponding one or more portions of the webpage content of the specified webpage.

10. The system of claim 9, wherein the annotation information repository comprises:

a database configured to perform operations comprising storing annotations collections, the storing of each of the plurality of the annotations collections being based on a set of identifiers including a webpage address of the associated webpage and an identifier of the associated annotation author; and an authentication module configured to perform operations comprising verifying permissions to the plurality of the annotations collections.

11. The system of claim 9, wherein an annotations collection from among of the stored plurality of the annotations collections comprises:

one or more verification records corresponding to the one or more annotations included in the annotations collection, where a verification record from among the one or more verification records includes permissions to and text mapping information associated with an annotation from among the one or more annotations included in the annotations collection to which the verification record corresponds; and one or more supplementary records corresponding to the one or more annotations included in the annotations collection, where a supplementary record from among the one or more supplementary records includes notes and addresses of cross-referenced webpages associated with an annotation from among the one or more annotations included in the annotations collection to which the supplementary record corresponds.

12. The system of claim 11, wherein the text mapping information included in the verification record corresponding to the annotation includes text offsets and a hash mask associated with a portion of the webpage content to which the annotations corresponds.

13. The system of claim 9 wherein the data processor is further configured to perform operations further comprising updating a stored instance of an annotations collection upon receipt from the computerized device of an updated instance of the annotations collection that includes a created or removed annotation corresponding to a portion of webpage content of the current instance of the specified webpage.

14. The system of claim 9 wherein the data processor is configured to perform operations comprising receiving, from the computerized device, another request to retrieve other annotations collections from among the plurality of annotations collections stored at the annotations information repository, the other annotations collections having been authored by other annotations authors and corresponding to the specified webpage, retrieving the other multiple annotations collections referenced in the other request, and transmitting the retrieved other annotations collections to the computerized device to enable the computerized device to concurrently display the transmitted other annotations collections, the previously transmitted annotations collection and the current instance of the specified webpage.

15. The system of claim 9, wherein a webpage, to which an annotations collection from among the stored annotations collections corresponds, comprises an online textbook, the webpage server corresponds to an online learning service, and the one or more annotations of the annotations collection correspond to respective portions of the online textbook.

16. The system of claim 9 further comprising:
a targeted advertisement system configured to communicate with the data processor and with the multiple computerized devices associated with the respective authors of webpage annotations, and further configured to serve ads based on affinities indicated by the respective authors of webpage annotations,
wherein the data processor is further configured to perform operations comprising
instructing the targeted advertisement system to serve ads to the computerized device based on information referenced by the annotations collection transmitted to the computerized device.

17. The system of claim 16, wherein the information referenced by the annotations collection transmitted to the computerized device comprises the one or more portions of the webpage content of the specified webpage to which the corresponding one or more annotations included in the transmitted annotations collection relate.

18. The system of claim 9, wherein the data processor is configured to perform operations further comprising
receiving, from the computerized device, another request to retrieve another annotations collection from among the plurality of annotations collections stored at the annotation information repository, the other annotations collection having been authored by another annotations author different from the specified author and corresponding to the specified webpage,
verifying permissions of the specified author to retrieve the other annotations collection using verification information included in the other annotations collection, and
responding to the request of the computerized device based on a result of said verifying the permissions.

19. The system of claim 18, wherein
the data processor is configured to perform operations further comprising
in response to said verifying the permissions,
determining that the specified author has permissions to retrieve a particular annotation from among the one or more annotations of the other annotations collection, and
retrieving the particular annotation of the other annotations collection, and
to perform said responding to the request, the data processor is configured to perform operations further comprising
transmitting, to the computerized device, a response including the retrieved particular annotation of the other annotations collection to enable the computerized device to concurrently display the transmitted particular annotation collection of the other annotations collections, the previously transmitted annotations collection and the current instance of the specified webpage.

20. The system of claim 18, wherein
the data processor is configured to perform operations further comprising
in response to said verifying the permissions,
determining that the specified author lacks permissions to retrieve the other annotations collection, and
to perform said responding to the request, the data processor is configured to perform operations further comprising
transmitting, to the computerized device, a response informing the specified author of said determining that the specified author lacks permissions to retrieve the other annotations collection.

21. A system for annotating webpage content, the system comprising:
a computerized device communicatively coupled with a webpage server under control of a third party and with an annotations repository under control of an entity different from the third party, the computerized device including:
a browser configured to perform first operations comprising, the first operations comprising
receiving, from a user associated with the computerized device, a request to access a webpage being hosted by the webpage server, where the user is other than both the third party and the entity different from the third party,
in response to said receiving from the user the request to access the webpage, requesting the webpage from the webpage server, and
receiving a response from the webpage server including a current instance of the webpage, and
the browser is further configured to perform second operations, the second operations comprising
requesting, from the annotations repository in response to said receiving from the user the request to access the webpage, a collection of annotations made to the webpage by the user associated with the computerized device, the annotations collection being stored at the annotations repository, the annotations collection including one or more annotations relating to corresponding one or more portions of webpage content of the webpage,
receiving a response from the annotations repository including the requested annotations collection, and
concurrently displaying the current instance of the webpage received with the response from the webpage server and the annotations collection received with the response from the annotations repository, such that the one or more annotations included in the received annotations collection are overlaid on the corresponding one or more portions of the webpage content of the received current instance of the webpage.

22. The system of claim 21 wherein the received annotations collection comprises:
one or more verification records corresponding to the one or more annotations included in the annotations collection, where a verification record from among the one or more verification records includes permissions to and text mapping information associated with an annotation from among the one or more annotations included in the annotations collection to which the verification record corresponds; and
one or more supplementary records corresponding to the one or more annotations included in the annotations collection, where a supplementary record from among the one or more supplementary records includes notes and addresses of cross-referenced webpages associated with an annotation from among the one or more annotations included in the annotations collection to which the supplementary record corresponds.

23. The system of claim 22 wherein
the text mapping information included in the verification record corresponding to the annotation includes text offsets and a hash mask associated with a portion of the webpage content to which the annotation corresponds, and the second operations further comprise
comparing the text offsets and the hash mask, included in the text mapping information included in the verification record corresponding to the annotation, with text properties of a portion of webpage content of the received current instance of the webpage that corresponds to the text offsets included in the text mapping information; and
if the comparison results in a mismatch, determining that the portion of the webpage content of the webpage corresponding to the text offsets included in the text mapping information has been modified by the third party since the annotation was created, and
if the comparison results in a match, determining that the portion of the webpage content of the webpage corresponding to the text offsets included in the text mapping information has not been modified by the third party since the annotation was created.

24. The system of claim 21 wherein the second operations further comprise
receiving, from the user associated with the computerized device, input creating at least one new annotation on the received current instance of the webpage in addition to the one or more annotations included in the received annotations collection, and
transmitting to the annotations repository the annotations collection with the at least one new annotation for updating the stored instance of the annotations collection.

25. The system of claim 21 wherein the second operations further comprise
informing the user associated with the computerized device of one or more additional annotations collections being available at the annotations repository, the one or more additional annotations collections having been authored by corresponding one or more other authors different from the user associated with the computerized device, and being associated with the webpage, each of the one or more additional annotations collections including one or more annotations relating to corresponding one or more portions of webpage content of the webpage,
receiving, from the user associated with the computerized device in response to said informing, a request to access an additional annotations collection from among the additional annotations collections,
in response to said receiving, from the user, of the request to access the additional annotations collection, requesting the additional annotations collection from the annotations repository,
receiving a response from the annotations repository including the additional annotations collection, and
concurrently displaying the received current instance of the webpage, the received additional annotations collection and the initially received annotations collection, such that the one or more annotations included in the initially received annotations collection and the one or more annotations included in the received additional annotations collection are overlaid on the corresponding portions of the webpage content of the received current instance of the webpage.

26. The system of claim 21, wherein
the one or more annotations included in the annotations collection received with the response from the annotations repository comprise two or more annotations, and the second operations further comprise
in response to determining that a portion of the webpage content of the received current instance of the webpage, to which an annotation from among the two or more annotations included in the received annotations collection corresponds, has been modified by the third party since the annotation was created,
removing from the received annotations collection the annotation corresponding to the modified portion of the webpage content, and
transmitting, to the annotations repository the annotations collection without the annotation corresponding to the modified portion of the webpage content for updating the stored instance of the annotations collection.

27. The system of claim 21, wherein the computerized device further comprises a browser plug-in, wherein the browser plug-in is configured to perform the second operations.

28. The system of claim 21, wherein
the computerized device further includes a storage device that stores the annotations repository, and
the entity other than the third party that controls the annotations repository is the user associated with the computerized device.

29. The system of claim 21, wherein
the webpage comprises an online textbook,
the webpage server corresponds to an online learning service, and
the one or more annotations of the annotations collection correspond to respective portions of the online textbook.

30. The system of claim 21, wherein
the computerized device is further communicatively coupled with a targeted advertising system associated with the annotations repository,
the second operations further comprise
receiving, from the targeted advertising system, ads related to the one or more portions of the webpage content of the current instance of the webpage, received with the response from the webpage server, that correspond to the one or more annotations included in the annotations collection, received with the response from the annotations repository, and
the first operations further comprise
presenting a set of the received ads to the user associated with computerized device.

31. The system of claim 30, wherein the second operations further comprise
generating the set of the received ads for said presenting to include one or more ads from among the received ads that match the one or more portions of the webpage content of the webpage.

32. The system of claim 21, wherein said concurrently displaying the received current instance of the webpage and the received annotations collection comprises second operations further comprising
in response to determining that a portion of the webpage content of the webpage, to which an annotation from among the one or more annotations included in the received annotations collection corresponds, has not been modified by the third party since the annotation was created,
highlighting a text block from a portion of the webpage content of the received current instance of the webpage to which the annotation corresponds.

33. The system of claim 32, wherein the second operations further comprise
- detecting a cursor being hovered by the user associated with the computerized device over the highlighted text block, and
- displaying, in response to said detecting of the hovering cursor, supplementary information associated with the annotation corresponding to the highlighted text block, including an address of a cross-referenced webpage.

34. The system of claim 33, wherein the second operations further comprise
- receiving, from the user associated with the computerized device, a request seeking access to the cross-referenced webpage.

35. The system of claim 21, wherein the second operations further comprise
- receiving, from the user associated with the computerized device, input indicating a portion of the webpage content of the received current instance of the webpage;
- recording, as part of a new annotation corresponding to the indicated portion of the webpage content, verification information referencing the indicated portion of the webpage content;
- receiving, from the user associated with the computerized device, input providing supplementary information associated with the indicated portion of the webpage content, the supplementary information including notes and addresses of cross-referenced webpages;
- recording, as part of the new annotation, the provided supplementary information; and
- transmitting, to the annotations repository, the new annotation corresponding to the indicated portion of the webpage content to be included in the stored instance of the annotations collection.

36. The system of claim 35, wherein
- the input indicating the portion of the webpage content of the received current instance of the webpage comprises input highlighting a text block of the received current instance of the webpage, and
- the verification information referencing the indicated portion of the webpage content comprises text offsets and a hash mask of the highlighted text block.

37. The system of claim 21, wherein the second operations further comprise
- receiving, from the user associated with the computerized device, input editing at least one annotation from among the one or more annotations of the received annotations collection overlaid on the received current instance of the webpage, and
- transmitting, to the annotations repository, the annotations collection with the at least one edited annotation for updating the stored instance of the annotations collection.

38. The system of claim 21, wherein
the one or more annotations included in the annotations collection received with the response from the annotations repository comprise two or more annotations, and
the second operations further comprise
- receiving, from the user associated with the computerized device, input removing an annotation from among the two or more annotations of the received annotations collection overlaid on the received current instance of the webpage, and
- transmitting, to the annotations repository, the annotations collection with the removed annotation for updating the stored instance of the annotations collection.

39. The system of claim 21, wherein
the computerized device is further communicatively coupled with a second annotations repository under control of a second entity different from the third party, and
the second operations further comprise
- informing the user associated with the computerized device of a second annotations collection being available at the second annotations repository, the second annotations collection having been authored by a second author different from the user associated with the computerized device, and being associated with the webpage, the second annotations collection including one or more annotations relating to corresponding one or more portions of webpage content of the webpage,
- receiving, from the user associated with the computerized device in response to said informing, a request to access the second annotations collection,
- in response to said receiving, from the user, of the request to access the second collection, requesting the second annotations collection from the second annotations repository,
- receiving a response from the second annotations repository including the second annotations collection, and
- concurrently displaying the current instance of the webpage received from the webpage server, the second annotations collection received from the second annotations repository and the annotations collection received from the annotations repository, such that the one or more annotations included in the initially received annotations collection and the one or more annotations included in the received second annotations collection are overlaid on the corresponding portions of the webpage content of the received current instance of the webpage.

40. A method comprising:
maintaining at an annotations repository system a plurality of annotations collections, each of the plurality of the annotations collections having been authored by an associated annotations author and corresponding to an associated webpage, such that each of the plurality of the annotations collections includes one or more annotations relating to corresponding one or more portions of webpage content of the associated webpage;
receiving, by the annotations repository system from an electronic device associated with a specified author, a request to retrieve an annotations collection from among the maintained plurality of annotations collections, the annotations collection referenced in the received request having been authored by the specified author, and corresponding to a specified webpage being accessed by the electronic device associated with the specified author from a webpage server system different from the annotations repository system, the annotations collection referenced in the received request including one or more annotations relating to corresponding one or more portions of webpage content of the specified webpage;
retrieving, by the annotations repository system, the annotations collection referenced in the received request from among the maintained plurality of annotations collections; and
transmitting, by the annotations repository system, the retrieved annotations collection to the electronic device to enable the electronic device to concurrently display the transmitted annotations collection and a current instance of the specified webpage, in such a way that the one or more annotations included in the transmitted annotations collection would be overlaid on the corresponding one or more portions of the webpage content of the specified webpage.

41. The method of claim 40, further comprising:
receiving, by the annotations repository system from the electronic device, another request to retrieve other annotations collections from among the plurality of annotations collections maintained at the annotations repository system, the other annotations collections having been authored by other annotations collections authors and corresponding to the specified webpage;
retrieving the other annotations collections referenced in the other request; and
transmitting the retrieved other annotations collections to the electronic device to enable the electronic device to concurrently display the transmitted other annotations collections, the previously transmitted annotations collection and the current instance of the specified webpage.

42. The method of claim 40, further comprising updating a stored instance of an annotations collection from among the plurality of annotations collections maintained at the annotations repository system upon receipt from the electronic device of an updated instance of the annotations collection that includes a created or removed annotation corresponding to a portion of webpage content of the current instance of the specified webpage.

* * * * *

UNITED STATES PATENT AND TRADEMARK OFFICE
CERTIFICATE OF CORRECTION

PATENT NO.        : 8,190,990 B2
APPLICATION NO.   : 12/163778
DATED             : May 29, 2012
INVENTOR(S)       : Sang Van Le It is certified that error appears in the above-identified patent and that said Letters Patent is hereby corrected as shown below:

Page 4, Claim 5, Column 14, line 18, please delete "annotations" and insert -- annotation --, therefor.

Page 5, Claim 7, Column 15, line 6, please delete "collections" and insert -- collection --, therefor.

Page 7, Claim 11, Column 16, line 16, after "among" please delete "of".

Page 8, Claim 13, Column 16, line 40, before "configured" please delete "further".

Page 9, Claim 14, Column 16, line 54, before "annotations" please delete "multiple".

Signed and Sealed this
Fourteenth Day of August, 2012

David J. Kappos
*Director of the United States Patent and Trademark Office*